United States Patent
Chen et al.

(10) Patent No.: US 6,667,948 B2
(45) Date of Patent: Dec. 23, 2003

(54) OPTICAL RECORDING MEDIUM HAVING ROM AREA AND RAM AREA

(75) Inventors: Yi-Ming Chen, Taipei Hsien (TW); Chiu-Hsiang Lee, Pingtung Hsien (TW); Jiun-Sheng Chen, Yunlin Hsien (TW)

(73) Assignee: Ritek Corporation, Hsinchu (TW)

( * ) Notice: Subject to any disclaimer, the term of this patent is extended or adjusted under 35 U.S.C. 154(b) by 112 days.

(21) Appl. No.: 09/727,638

(22) Filed: Dec. 1, 2000

(65) Prior Publication Data
US 2002/0024922 A1 Feb. 28, 2002

(30) Foreign Application Priority Data
Dec. 9, 2000 (TW) .......................................... 89115370

(51) Int. Cl.$^7$ ................................................. G11B 7/24
(52) U.S. Cl. ................. 369/275.2; 428/64.4; 369/275.3
(58) Field of Search ......................... 369/275.3, 275.2, 369/275.1, 13.35, 272; 428/64.1, 64.3, 64.4; 430/320, 321

(56) References Cited

U.S. PATENT DOCUMENTS

| | | | | |
|---|---|---|---|---|
| 5,537,387 A | * | 7/1996 | Ando et al. | 369/275.1 |
| 6,031,808 A | * | 2/2000 | Ueno | 369/111 |
| 6,229,784 B1 | * | 5/2001 | Yoshimoto et al. | 369/275.3 |
| 6,310,854 B1 | * | 10/2001 | Sato et al. | 369/275.3 |

* cited by examiner

Primary Examiner—Tan Dinh
(74) Attorney, Agent, or Firm—J.C. Patents

(57) ABSTRACT

An optical recording medium and a method for fabricating the same. A read only data region, a writable/readable data region and a content recording region are formed on a transparent substrate. The read only data region is used to store prerecording data which can only be read but is unable to be rewritten. The writable/readable data region is used to read and write data, while the content recording region is used to record initial address information of the recorded data in the read only data region, the writable/readable data region and the content recording region. A recording layer in the writable/readable data region is formed with the derivative of cyanine dye, phthalocyanine dye or azo dye. Or alternatively, the recording layer is made of an alloy containing tellurium, germanium, or antimony, or an alloy containing indium, silver, antimony or tellurium.

14 Claims, 3 Drawing Sheets

OPTICAL RECORDING MEDIUM HAVING ROM AREA AND RAM AREA

CROSS-REFERENCE TO RELATED APPLICATION

This application claims the priority benefit of Taiwan application serial no. 89115370, filed Jul. 31, 2000.

BACKGROUND OF THE INVENTION

1. Field of the Invention

The invention relates in general to an optical recording medium and a method for fabricating the same. More particularly, this invention relates to an optical recording medium having a read only data region and a writable data region and the method for fabricating the same.

2. Description of the Related Art

As the multimedia has been widely and commonly applied, many data carried by the multimedia contain massive text, sound and image information. Consequently, development of data recording and storing media has been concentrated on high storage density and access speed. Since the compact disc has the advantages such as high storage density, compact volume, long duration, low cost, high compatibility and low fault rate, it has been the leading recording medium for portable optical data storage.

FIG. 1 shows a top view of a transparent substrate 12 of conventional compact disc 10. FIG. 2 is a cross sectional view showing the local structure of the compact disc 10. In FIG. 1, the transparent substrate 12 comprises an opening 14 at the center thereof, and pre-pits 16 spirally distributing on the transparent substrate 12. The pre-pits 16 contain the digital data that the compact disc stores. In FIG. 2, a reflecting layer 18 is formed on the transparent substrate 12 to reflect a laser light beam emitted from an optical reading/writing head 24. A protection layer 20 is formed on the reflecting layer 18 to avoid damage on the recorded data in the compact disc 10 by the ambient. The transparent substrate 12 is typically made of polycarbonate, and the reflecting layer 18 is typically made of aluminum (Al), copper (Cu), gold (Au), silver (Ag) or platinum (Pt) or the alloy for any of the above material.

The laser light beam 26 transmits through the transparent substrate 12 to shine on the reflecting layer 18. The laser light beam 26 is then reflected to a light detector by the reflecting layer 18 to access the recorded data in the compact disc 10. As the recorded data are stored in a form of the pre-pits 16 on the transparent substrate 12, the user can only read the stored data using a compact disc drive without being able to record new data in the compact disc 10. When the data to be recorded is relevant to the data stored in the compact disc 10, the user must record such data into another compact disc. The causes great inconvenience in data access for the users.

SUMMARY OF THE INVENTION

The invention provides an optical recording medium and the method for fabrication the same to resolve the problems occurring in the conventional structure and method.

A read only data region is formed on a transparent substrate. A writable/readable data region and a content recording region are further formed on the transparent substrate. The read only data region is used to store a pre-recording data which can only be read, but cannot be rewritten. The data stored in the writable/readable data region can be rewritten and read as required. The content recording region is to record the initial address information for the recorded data and recording regions of the read only data region as well as the initial address information for the recorded data and recording regions of the writable/readable data region. The recording data region comprises a recording layer made of derivatives of cyanine dye, phthalocyanine dye, or azo dye. Or alternatively, the recording layer is made of an alloy containing tellurium (Te), antimony (Sb), or an alloy containing indium (In), silver (Ag), antimony or tellurium.

Since the above optical recording medium comprises a read only data region and a writable/readable data region, the inconvenience for data access in the conventional structure is resolved. The read only data region provides the user to read a prerecording data only. The writable/read data region enable the user to write and read the data relative to the pre-recording data without storing the relative data into another optical recording medium.

Both the foregoing general description and the following detailed description are exemplary and explanatory only and are not restrictive of the invention, as claimed.

DESCRIPTION OF THE PREFERRED EMBODIMENTS

Figure 1:
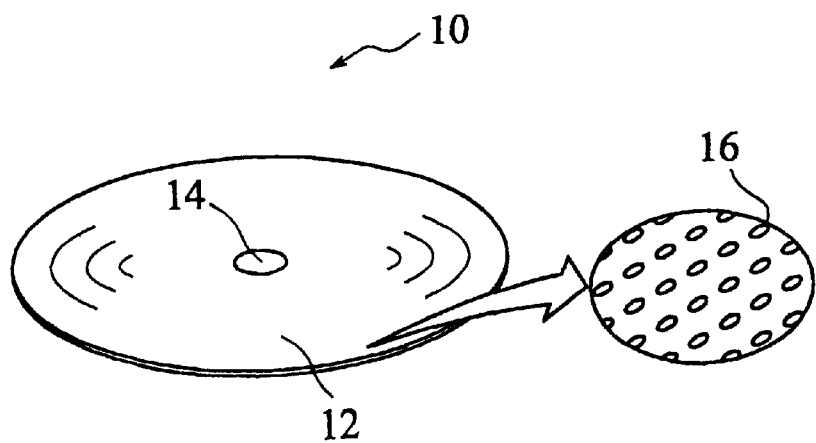
FIG. 1 shows a top view of a conventional read only compact disc.
Figure 2:
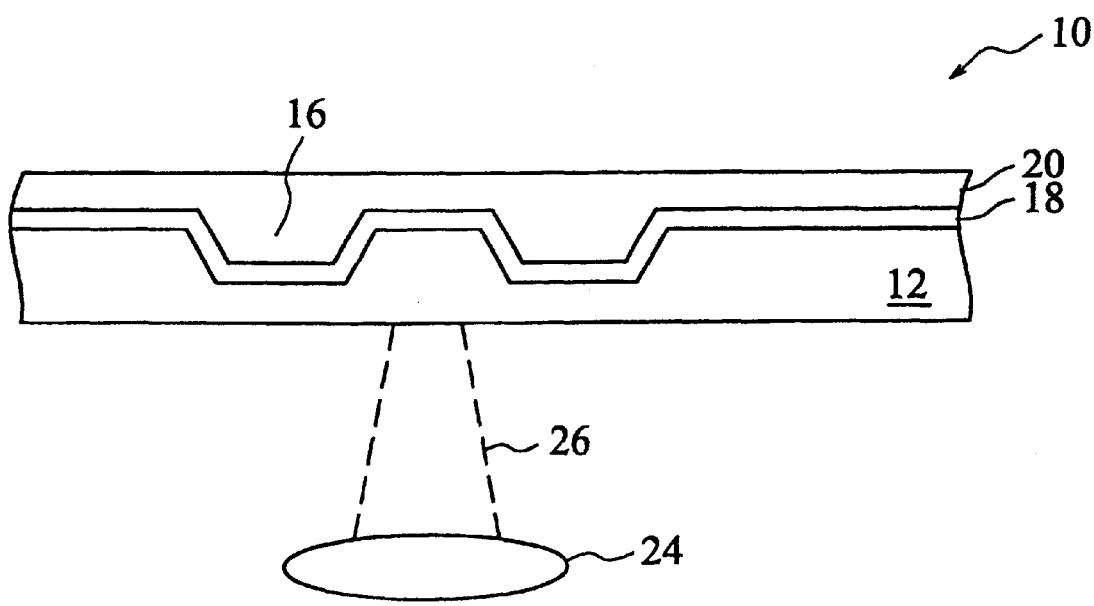
FIG. 2 is a cross sectional view showing a part of the conventional read only compact disc.
Figure 3:
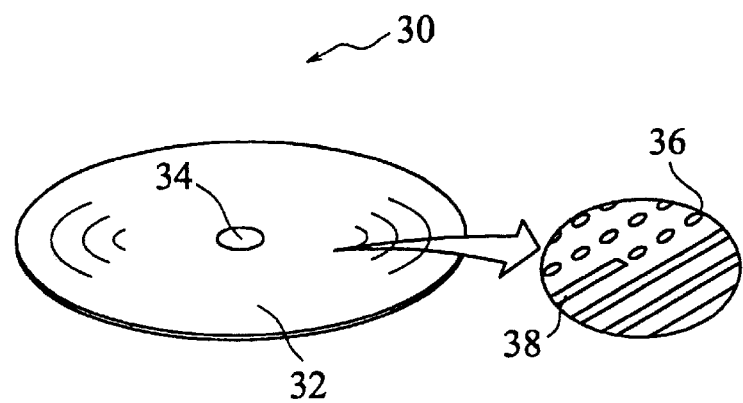
FIG. 3 is a top view of a transparent substrate of an optical recording medium provided by the invention.

As shown in FIG. 3, a transparent substrate 32 of an optical recording medium 30 is formed by a milling process and an ejection process. Preferably, the transparent substrate 32 is made of polycarbonate (PC). The transparent substrate 32 comprises an opening in the center, pre-pits 36 spirally arranged on the inner surface thereof, and pre-grooves 38 spirally surrounding in an outer surface of the transparent substrate 32. The pre-pits 36 representing the data stored in the optical recording medium 30 comprises a first content data region 33 and read only data region 35. The pre-grooves 38 lead an optical read/write head 37 for data access, so that the laser light beam 39 emitted from the optical read/write head 37 is focused on the pre-grooves 38. The first content data region 33 is used to record the initial address information of the recording regions of the read only data region 35, the initial address information of the recording regions of a writable/readable data region 47 formed subsequently, and the initial address information of the recorded data in the read only data region 35.

Figure 4:
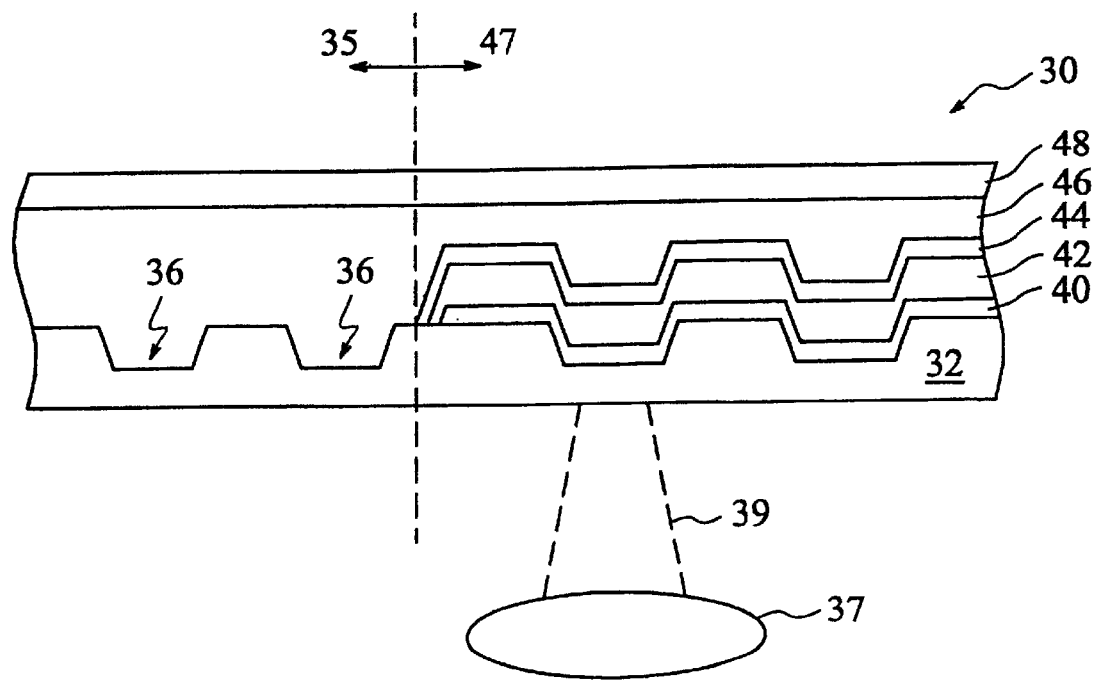
FIG. 4 shows a cross sectional view of the optical recording medium provided by the invention.

In FIG. 4, a cross sectional view of the junction between the read only data region 35 and the writable/readable data region 47 is shown. A dielectric layer 40 is formed on the outer surface of the transparent substrate 32, that is, on the writable/readable read only region 47. Using sputtering or evaporation, a recording layer 42 is formed on the dielectric layer 40. A dielectric layer 44 is formed on the recording layer 42. Using sputtering or evaporation, a reflecting layer 46 is formed on the dielectric layer 44. The reflecting layer 46 is formed reflect the laser light beam 39 from the optical read/write head 37. A protection layer 48 is then formed on the reflecting layer 46 to prevent from damaging the data stored in the compact disc 30 due to ambient or external force. While the optical recording medium 30 is in use, a portion of the writable/readable data region 47 (typically the periphery) is distinghuised as a second content data region 49 to record the initial information address of the recorded data in the writable/readable data region 47.

Figure 5:
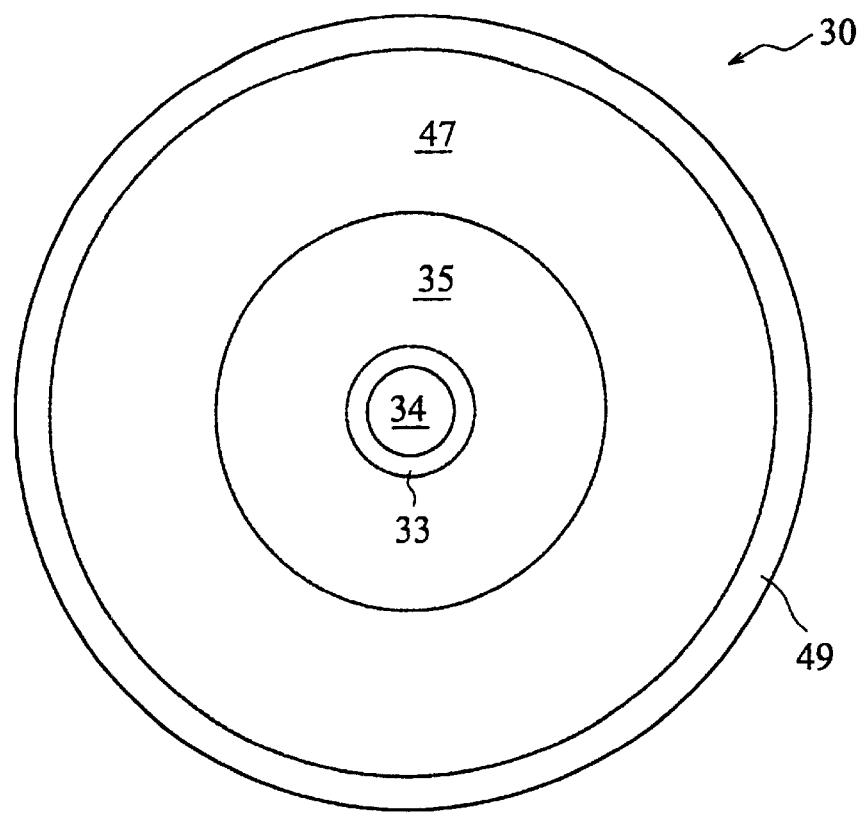
FIG. 5 shows the top view of the optical recording medium.

The recording layer is made of an alloy comprising at least one of tellurium, germanium and antimony or an alloy comprising at least one of indium, silver, antimony and tellurium. The dielectric layer 44 and the dielectric layer 40 are made of silicon nitride ($SiN_x$), silicon oxide ($SiO_x$) or zinc-silicon dioxide ($ZnS-SiO_2$). The reflecting layer is made of metal with high reflectivity such as aluminum (Al), copper (Cu), silver (Ag), gold (Au) or platinum (Pt) or an alloy of any of the above metals. In FIG. 5, a structure of the optical recording medium 30 is shown. The optical recording medium 30 comprises the first content data region 33, the read only data region 35, the writable/readable data region 47 and the second content data region 49.

Figure 6:
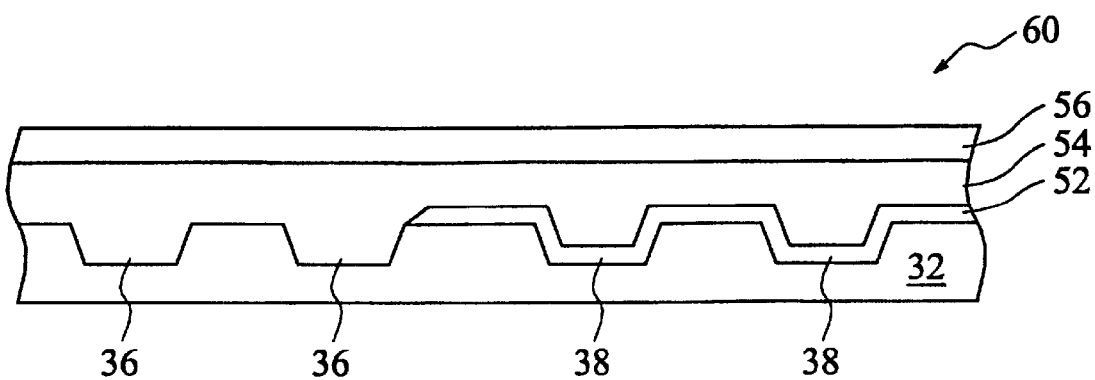
FIG. 6 shows a local cross sectional view of the optical recording medium.

In FIG. 6, another embodiment of the invention is shown. The read only data region 47 is formed on the transparent substrate 32, so as to form an optical recording medium 60. Using spin-on coating the outer surface of the transparent substrate 32, a recording layer 52 is formed on the writable/readable data region 47. A reflecting layer 54 is further formed on the transparent substrate 32 using sputtering or evaporation. The reflecting layer 54 is used to reflect the laser light beam from an optical write/read head. A protection layer 56 is formed to avoid damage of the data stored in the optical recording medium 60 according to ambient parameters or external force. The recording layer 52 is made of the derivative of cyanine dye, phthalocyanine dye or azo dye.

Compared to the prior art, the optical recording medium comprises the read only data region and writable/readable data region to avoid the inconvenience of recording data into different media. The read only data region is to store a pre-recording data, while the writable/readable data region provides the user to store the data relative to the pre-recording data. Since the user can store the relative data of the pre-recording data in the writable/readable data region, an additional optical recording medium is not required to resolve the inconvenience in the conventional structure.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. An optical recording medium, comprising:
   a transparent substrate, including an opening at a center thereof;
   a read only data region on the transparent substrate, the read only data being used to store a pre-recording data which can be read only and unable to be rewritten;
   a writable/readable data region on the transparent substrate, a recording data thereon being able to be read and rewritten; and
   a content recording region, located on the transparent substrate to record initial address information of recording data and recording regions of the read only data region, and initial address information of the recording data and recording regions of the writable/readable data region, said content recording region comprising a first content data region located at an inner periphery of the transparent substrate to record the initial address information of the recording data of the read only data region, the initial address information of the recording regions of the read only data region, and the initial address information of the recording regions of the writable/readable data region.

2. The optical recording medium according to claim 1, wherein the read only data region comprises a plurality of spirally arranged pre-pits and a reflecting layer on the transparent substrate.

3. The optical recording medium according to claim 1, wherein the writable/readable data region comprises a spirally arranged pre-groove at the transparent substrate surface, a recording layer over the transparent substrate, and a reflecting layer on the recording layer.

4. The optical recording medium according to claim 3, wherein the recording layer is made of a derivative of cyanine dye, phthalocyanine dye or azo dye.

5. The optical recording medium according to claim 2, wherein the writable/readable data region comprises a spiral pre-groove at the transparent substrate surface, a first dielectric layer on the transparent substrate, a recording layer on the first dielectric layer, a second dielectric layer on the recording layer and a reflecting layer on the second dielectric layer.

6. The optical recording medium according to claim 5, wherein the recording layer is made of an alloy comprising at least one of tellurium, germanium, antimony or an alloy comprising at least one of indium, silver, antimony and tellurium.

7. The optical recording medium according to claim 1, wherein the content recording region farther comprises a second content data region at an outer periphery of the transparent substrate to record the initial address information of the recording data of the writable/readable data region.

8. A method for fabricating an optical recording medium, the method comprising:
   forming a read only data region on a transparent substrate to store a pre-recording data which can only be read, but not be rewritten;
   forming a writable/readable data region to store recording data which can be rewritten and read; and
   forming a content recording region to record initial address information of recording data and recording regions of the read only data region, and initial address information of the recording data and recording regions of the writable/readable data region, said content recording region comprising a first content data region located at an inner periphery of the transparent substrate to record the initial address information of the recording data of the read only data region, the initial address information of the recording region of the read only data region, and the initial address information of the recording regions of the writable/readable data region.

9. The method according to claim 8, wherein the step of forming the read only data region further comprises forming a plurality of pre-pits at the transparent substrate surface and forming a reflecting layer on the transparent substrate using sputtering or evaporation.

10. The method according to claim 8, wherein the step of forming the writable/readable data region comprising a step of forming the transparent substrate with spiral pre-groove on a surface thereof, the step further comprising:

forming a recording layer on the transparent substrate using spin on coating; and forming a reflecting layer using sputtering and evaporation.

11. The method according to claim 10, wherein the step of forming the recording layer comprises forming the recording layer with a derivative of cyanine dye, phthalocyanine dye or azo dye.

12. The method according to claim 8, wherein the step of forming the writable/readable data region comprising a step of forming the transparent substrate with spiral pro-groove on a surface thereof, the step further comprising:

forming a first dielectric layer on the transparent substrate;

forming a recording layer on the first dielectric layer using sputtering or evaporation;

forming a second dielectric layer on the recording layer, and forming a reflecting layer on the second dielectric layer using sputtering or evaporation.

13. The method according to claim 12, wherein the step of forming the recording layer comprises a step of forming the recording layer with an alloy containing tellurium, germanium or antimony or with an alloy containing indium, silver, antimony or tellurium.

14. The method according to claim 8, wherein further comprising a step of forming a second content data region at an outer periphery of the transparent substrate to record the initial address information of the recording data of the writable/readable data region.

* * * * *